United States Patent
Schirtzinger

(10) Patent No.: US 8,240,126 B2
(45) Date of Patent: Aug. 14, 2012

(54) VALVE SYSTEM FOR A GAS TURBINE ENGINE

(75) Inventor: Gary A. Schirtzinger, Glastonbury, CT (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 1167 days.

(21) Appl. No.: 12/053,595

(22) Filed: Mar. 22, 2008

(65) Prior Publication Data

US 2009/0235643 A1    Sep. 24, 2009

(51) Int. Cl.
*F02K 1/00*  (2006.01)
*B63H 25/46*  (2006.01)

(52) U.S. Cl. ........................ 60/231; 239/265.17

(58) Field of Classification Search ............... 60/39.23, 60/226.1, 226.3, 231, 262, 267; 239/123.3, 239/127.1, 265.17, 265.19
See application file for complete search history.

(56) References Cited

U.S. PATENT DOCUMENTS

| | | | |
|---|---|---|---|
| 4,409,788 A | 10/1983 | Nash | |
| 4,570,668 A | 2/1986 | Burke et al. | |
| 4,674,951 A | 6/1987 | Jourdain et al. | |
| 4,679,982 A | 7/1987 | Bouiller et al. | |
| 4,711,084 A | 12/1987 | Brockett | |
| 4,854,127 A | 8/1989 | Vinson et al. | |
| 5,012,639 A | 5/1991 | Ream et al. | |
| 5,123,240 A | 6/1992 | Frost et al. | |
| 5,127,222 A | 7/1992 | Ream et al. | |
| 5,184,459 A * | 2/1993 | McAndrews | 60/226.3 |
| 5,211,007 A | 5/1993 | Marvin | |
| 5,307,624 A | 5/1994 | Even-Nur et al. | |
| 5,372,006 A | 12/1994 | Lair | |
| 5,867,980 A | 2/1999 | Bartos | |
| 5,941,065 A * | 8/1999 | Lidstone et al. | 60/771 |
| 6,264,137 B1 | 7/2001 | Sheoran | |
| 6,301,877 B1 | 10/2001 | Liang et al. | |
| 6,385,959 B1 | 5/2002 | Montoya | |
| 6,471,475 B1 | 10/2002 | Sasu et al. | |
| 6,622,475 B2 | 9/2003 | Brault et al. | |
| 6,679,048 B1 | 1/2004 | Lee et al. | |
| 6,694,723 B2 | 2/2004 | Ward | |
| 6,701,715 B2 | 3/2004 | Anderson et al. | |
| 6,802,691 B2 | 10/2004 | Chlus | |
| 6,877,306 B2 | 4/2005 | Wernberg et al. | |
| 6,895,756 B2 | 5/2005 | Schmotolocha et al. | |
| 6,907,724 B2 | 6/2005 | Edelman et al. | |
| 6,997,676 B2 | 2/2006 | Koshoffer | |
| 7,028,484 B2 | 4/2006 | Prociw et al. | |
| 7,032,835 B2 | 4/2006 | Murphy et al. | |
| 7,055,303 B2 | 6/2006 | Macfarlane et al. | |
| 7,093,442 B2 | 8/2006 | Lovett | |
| 7,093,793 B2 * | 8/2006 | Lair | 60/226.3 |
| 7,114,519 B2 | 10/2006 | Aitchison et al. | |
| 7,174,704 B2 | 2/2007 | Renggli | |
| 7,189,055 B2 | 3/2007 | Marini et al. | |
| 7,225,623 B2 | 6/2007 | Koshoffer | |

(Continued)

OTHER PUBLICATIONS

European Search Report, dated May 24, 2011.

*Primary Examiner* — Ehud Gartenberg
*Assistant Examiner* — Erun Goyal
(74) *Attorney, Agent, or Firm* — Carlson, Gaskey & Olds

(57) ABSTRACT

A valve system intermediate a secondary flow path and a primary flow path to selectively communicate secondary airflow into the primary gas flow path and control airflow injected from a higher pressure plenum into a lower pressure flowpath.

19 Claims, 2 Drawing Sheets

U.S. PATENT DOCUMENTS

| | | |
|---|---|---|
| 7,244,104 B2 | 7/2007 | Girgis et al. |
| 7,475,545 B2 * | 1/2009 | Johnson .......................... 60/761 |
| 2003/0126853 A1 | 7/2003 | Koshoffer et al. |
| 2003/0217552 A1 | 11/2003 | Calabro |
| 2004/0006969 A1 | 1/2004 | Whurr |
| 2004/0187474 A1 | 9/2004 | Martens et al. |
| 2004/0216444 A1 | 11/2004 | Lovett |
| 2005/0081509 A1 | 4/2005 | Johnson |
| 2005/0091982 A1 | 5/2005 | Renggli et al. |
| 2005/0172611 A1 | 8/2005 | Blodgett |

* cited by examiner

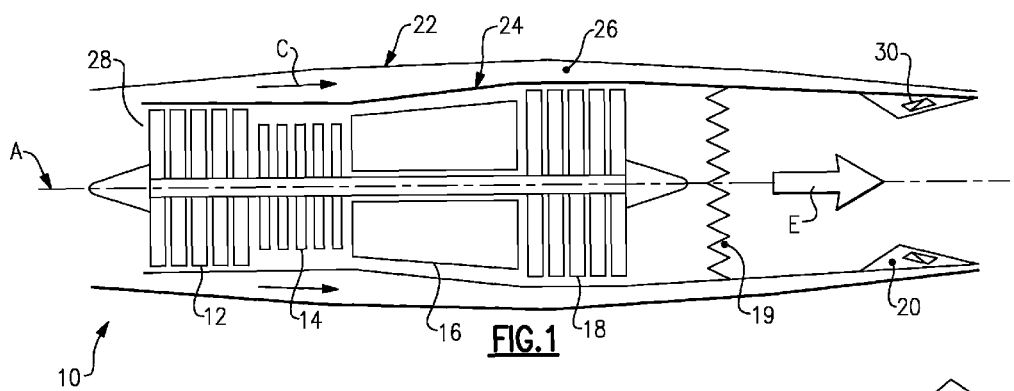
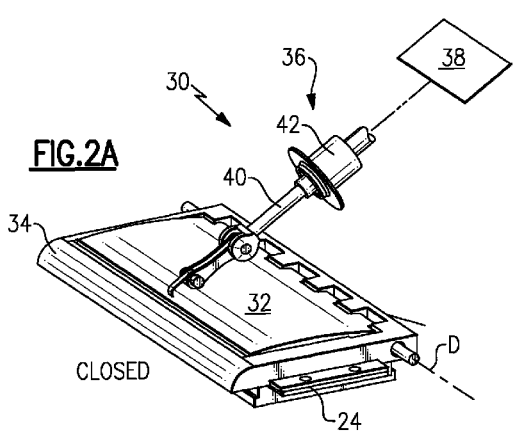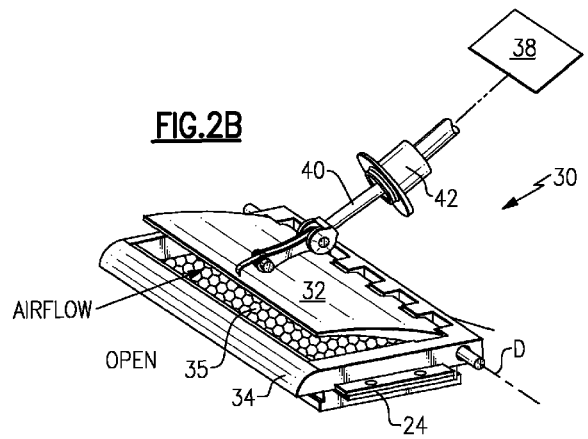

VALVE SYSTEM FOR A GAS TURBINE ENGINE

BACKGROUND OF THE INVENTION

The present invention relates to a gas turbine engine, and more particularly to a valve system for operation therewith.

A gas turbine engine, such as a turbofan engine for an aircraft, includes a fan section, a compression section, a combustion section, and a turbine section. An axis of the engine is centrally disposed within the engine, and extends longitudinally through these sections. A primary flow path extends axially through the engine. An annular secondary flow path is generally located radially outward of the primary flow path.

Cooling air along the secondary flow path is often communicated to the primary flow path during particular operating conditions. In order to assure efficient engine operation and performance, communication of the cooling air from the secondary flow path to the primary flow path needs to be meticulously rationed.

SUMMARY OF THE INVENTION

The valve system according to an exemplary aspect of the present invention is located intermediate a secondary flow path and a primary exhaust flow path. The valve system selectively communicates secondary airflow to control airflow from the higher pressure plenum into the lower pressure flowpath. The valve system generally includes a shaped door which is pivotally mounted to a contoured frame about a door axis for movement between a closed position and an open position. The shaped door and contoured frame are configured to minimize airflow blockage when closed and facilitate airflow direction when open.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 1 is a general sectional view an exemplary gas turbine engine embodiment for use with the present invention;

FIG. 2A is an expanded view of a valve system in a closed position for use with the gas turbine engine;

FIG. 2B is an expanded view of a valve system in an open position for use with the gas turbine engine.

DETAILED DESCRIPTION OF THE DISCLOSED EMBODIMENT

Figure 3A:
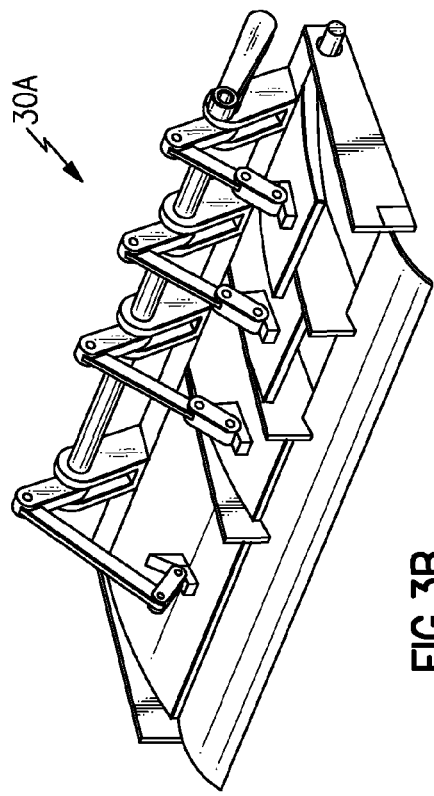
FIGS. 3A-3D are perspective views of another valve system with multiple doors.

FIG. 1 schematically illustrates a gas turbine engine 10 which generally includes a fan section 12, a compressor section 14, a combustor section 16, a turbine section 18, an augmentor section 19, and a nozzle section 20. The compressor section 14, combustor section 16, and turbine section 18 are generally referred to as the core engine. An axis of the engine A is centrally disposed and extends longitudinally through these sections.

An engine duct structure 22 and an inner cooling liner structure 24 define an annular secondary flow path 26 at least partially around a perimeter of a primary flow path 28 which directs a primary combustion core gas exhaust flow (illustrated schematically by arrow E). It should be understood that the engine duct structure 22 may also at least partially define various airflow paths other than the disclosed secondary flow path 26.

The secondary flow path 26 guides a secondary airflow C between the engine duct structure 22 and the inner cooling liner structure 24. The secondary airflow as defined herein may be any airflow different from the primary combustion core gas exhaust flow E such as advent cycle third stream fan flow which may be sourced from the fan section 12 and/or compressor section 14. The secondary airflow C is utilized for a multiple of purposes including, for example, cooling, pressurization, partial shielding and mixing with the core gas flow E in the nozzle section 20 during particular operational profiles. The valve system 30 operates rapidly and repeatedly while configured to be received within minimal package space.

A valve system 30 is located intermediate the secondary flow path 26 and the primary flow path 28 to selectively communicate secondary airflow C into the primary gas flow path E. For example only, under certain conditions, such as when an aircraft is hovering, less secondary airflow may be required in the nozzle section 20. By blocking the secondary airflow thereto, additional secondary airflow then becomes available for other purposes. It should be understood that the valve system 30 may be utilized in any location and any environment to control airflow injected from a higher pressure plenum into a lower pressure flowpath such as, for example only, in a nozzle section of a gas turbine engine.

Referring to FIG. 2A, the valve system 30 generally includes a shaped door 32 which is pivotally mounted to a contoured frame 34 about a door axis D for movement between a closed position and an open position (FIG. 2B). The shaped door 32 and contoured frame 34 are shaped to minimize airflow blockage when closed and facilitate airflow direction when open. The shaped door 32 and contoured frame 34 in one disclosed embodiment may be directionally shaped in a generally airfoil arrangement.

The contoured frame 34 may be mounted to a plenum wall such as the inner cooling liner structure 24 to provide for communication between the secondary flow path 26 and the primary flow path 28. The contoured frame 34 at least partially surrounds an airflow path 35 (FIG. 2B) which may further guide the airflow between the secondary flow path 26 and the primary flow path 28. The airflow path 35 may include a mesh, grid, metering hole or honeycomb structure which directs and smoothes the airflow therethrough as well as reduces noise generation.

An actuator system 36 having a hydraulic, pneumatic or electromagnetic actuator 38 controls movement of the shaped door 32 through a linkage 40. The linkage 40 may include a seal structure 42 which may be located at the engine duct structure 22 such that the actuator 38 may be located external to the engine duct structure 22. It should be understood that various actuator systems may be usable with the present invention.

Figure 3B:
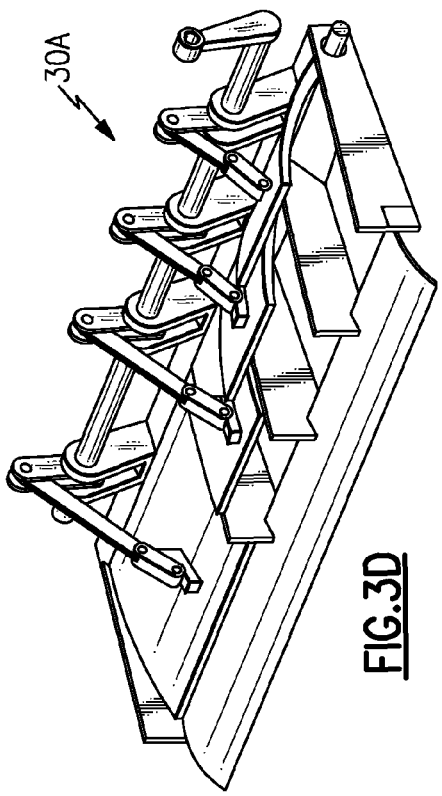
Figure 3C:
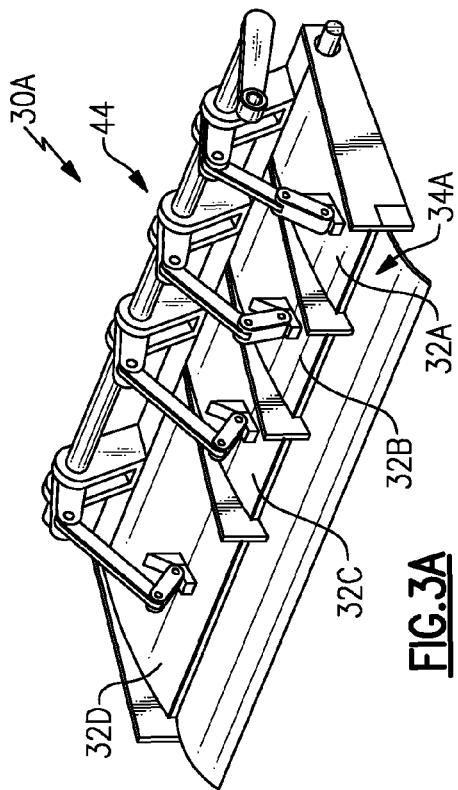
Figure 3D:
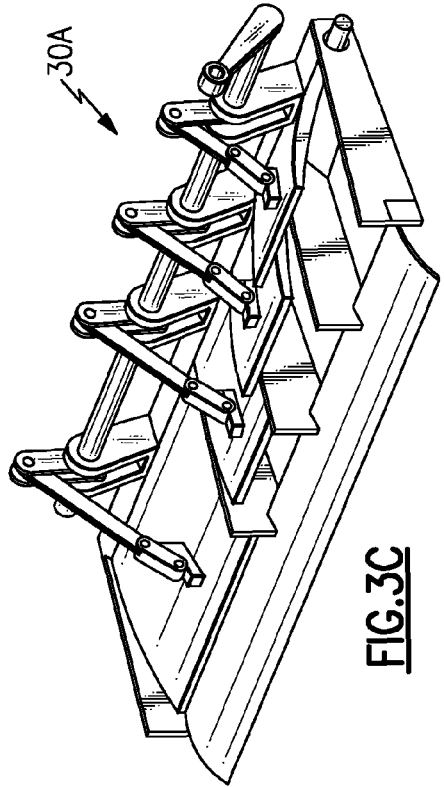

Referring to FIG. 3A, another embodiment of the valve system 30A includes a multitude of shaped doors 32A-32D which are pivotally mounted to a contoured frame 34A about a door axis D. Each of the multiple of shaped doors 32A-32D are movable between a closed position and a multiple of open positions (FIGS. 3B-3D) through an actuator system 44 which may sequentially open each of the multitude of shaped doors 32A-32D. One multiple of open positions are illustrated in FIGS. 3A-3D as an incremental opening of the multiple of shaped doors 32A-32D in a serial manner by the actuator system 44. That is, FIG. 3A is an illustration of a fully closed position; FIG. 3B illustrates the opening of shaped door 32A and initial opening of shaped door 32B; FIG. 3C illustrates the further opening of shaped door 32A and 32B and begins to open shaped door 32C; FIG. 3D illustrates opening of shaped doors 32A, 32B, 32C while shaped door 32D just begins to open. It should be understood that further views of this sequence would show movement of each of the shaped doors 32A-32D toward their respective fully opened position. It should be understood that this sequence of opening is but a single non-limiting embodiment and that other, different, or variable opening sequences may alternatively or additionally be provided. Furthermore, each shaped door may be individually operated rather than operated through the single actuator system 44. The actuator system 44 may include a crank structure which opens each of the multitude of shaped doors 32A-32D in accords with a predetermined sequence. That is, the multitude of shaped doors 32A-32D may be of different sizes and shapes to open in a sequence which communicates a predetermined volume of airflow relative to the predetermined sequence. It should be understood that essentially infinite positions may be provided. Alternatively, each of the multitude of shaped doors 32A-32D may be individually operated through independent linkages.

Each of the multitude of shaped doors 32A-32D may be of equivalent or different size to control airflow therethrough in response to the size of the door and the degree to which each door is opened. It should be understood that other opening sequences and arrangements may alternatively or additionally be provided.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A valve system intermediate a secondary flow path and a primary flow path of a gas turbine engine comprising:
   a contoured frame including a flow passage there through;
   a shaped door pivotable relative said contoured frame between an open position and a closed position, said shaped door and said contoured frame together defining an airfoil shape when said shaped door is in said closed position;
   a nozzle to eject said primary flow;
   said door located at a downstream end of said nozzle;
   wherein said contoured frame is mounted to an inner cooling liner structure of a core of a gas turbine engine;
   wherein said shaped door is pivotable about a door axis at a downstream end of said shaped door and said shaped door opens to direct airflow through said contoured frame.

2. The system as recited in claim 1, further comprising an actuator system which operates said shaped door.

3. The system as recited in claim 1, wherein said contoured frame supports a multitude of shaped doors, each of said multitude of shaped doors movable relative to said contoured frame.

4. The system as recited in claim 3, further comprising an actuator system which operates said multitude of shaped doors.

5. The system as recited in claim 3, further comprising an actuator system which independently operates each of said multitude of shaped doors.

6. The system as recited in claim 1, wherein said flow passage includes a structure that directs flow there through, and said structure is selected from the group consisting of a mesh, a grid, a metering hole and a honeycomb.

7. The system as recited in claim 6, wherein said structure is the mesh.

8. The system as recited in claim 6, wherein said structure is the grid.

9. The system as recited in claim 6, wherein said structure is the honeycomb.

10. A gas turbine engine comprising:
    an engine duct structure and an inner cooling liner structure which at least partially define a secondary flow path and a primary flow path along a longitudinal axis;
    a contoured frame mounted to said inner cooling liner structure, said contoured frame including a flow passage there through; and
    at least one shaped door pivotable relative said contoured frame between an open position away from the longitudinal axis and a closed position toward the engine axis, said at least one shaped door and said contoured frame together defining an airfoil shape when said at least one shaped door is in said closed position;
    a nozzle to eject said primary flow;
    said door located at a downstream end of said nozzle;
    wherein said contoured frame is mounted to an inner cooling liner structure of a core of a gas turbine engine;
    wherein said shaped door is pivotable about a door axis at a downstream end of said shaped door and said shaped door opens to direct airflow through said contoured frame.

11. The engine as recited in claim 10, wherein said contoured frame is flush with said inner cooling liner structure.

12. The engine as recited in claim 10, wherein said at least one shaped door includes a multitude of shaped doors, each of said multitude of shaped doors movable relative to said contoured frame.

13. The system as recited in claim 10, further comprising an actuator system which operates said shaped door, said actuator system including a linkage which extends through said engine duct structure.

14. The engine as recited in claim 10, wherein said secondary flow path is defined radially about said primary flow path.

15. The engine as recited in claim 10, including a core engine comprising a compressor section, a combustor section and a turbine section arranged to discharge an exhaust flow to said primary flow path and said primary flow path is defined by said inner cooling liner structure.

16. The engine as recited in claim 10, wherein said flow passage includes a structure that directs flow there through, and said structure is selected from the group consisting of a mesh, a grid, a metering hole and a honeycomb.

17. A method of a controlling communication of a secondary flow path with a primary flow path of a gas turbine engine, the method comprising:
- selectively pivoting at least one door about a door axis located at a downstream end of the at least one door between an open position and a closed position relative a frame mounted intermediate the secondary flow path and the primary flow path;
- providing a nozzle to eject said primary flow;
- locating said door at a downstream end of said nozzle;
- mounting said frame to an inner cooling liner structure of a core of a gas turbine engine;
- pivoting said door about a door axis at a downstream end of said door and wherein said door opens to direct airflow through said frame.

18. A method as recited in claim 17, including:
(a) opening the at least one door outwardly relative the primary flow path, and the primary flow path is a core engine exhaust flow.

19. The method as recited in claim 17, including directing flow through a flow passage of the frame using a structure selected from the group consisting of a mesh, a grid, a metering hole and a honeycomb.

* * * * *